(12) United States Patent
Chang

(10) Patent No.: US 8,436,293 B2
(45) Date of Patent: May 7, 2013

(54) OPTICAL ENCODER AND METHOD FOR MEASURING DISPLACEMENT INFORMATION USING MULTIPLE OPTICAL TRACKS OF DIFFRACTIVE OPTICAL REGIONS HAVING DIFFERENT PERIODICITIES

(76) Inventor: Christopher C. Chang, Brentwood, CA (US)

( * ) Notice: Subject to any disclaimer, the term of this patent is extended or adjusted under 35 U.S.C. 154(b) by 416 days.

(21) Appl. No.: 12/711,156

(22) Filed: Feb. 23, 2010

(65) Prior Publication Data

US 2010/0213358 A1 Aug. 26, 2010

Related U.S. Application Data

(60) Provisional application No. 61/154,749, filed on Feb. 23, 2009.

(51) Int. Cl.
*G01D 5/34* (2006.01)
*G01D 5/36* (2006.01)
*G06M 7/00* (2006.01)

(52) U.S. Cl.
USPC ............... 250/231.13; 250/237 G; 250/221

(58) Field of Classification Search ............ 250/231.13–231.18, 221, 237 G; 356/614–620; 359/436; 341/13, 14; 33/1 R, 1 N, 1 SP, 1 PT
See application file for complete search history.

(56) References Cited

U.S. PATENT DOCUMENTS

| | | | | |
|---|---|---|---|---|
| 4,778,273 A | * | 10/1988 | Michel | 356/619 |
| 4,956,553 A | * | 9/1990 | Matsui | 250/237 G |
| 5,260,568 A | * | 11/1993 | Ieki | 250/231.18 |
| 7,872,762 B2 | * | 1/2011 | Hermann et al. | 356/499 |
| 2008/0087805 A1 | * | 4/2008 | Kress | 250/231.13 |

* cited by examiner

*Primary Examiner* — Pascal M Bui Pho
(74) *Attorney, Agent, or Firm* — Wilson Ham & Holman; Thomas H. Ham

(57) ABSTRACT

An optical encoder and method for measuring displacement information uses an encoder member that includes multiple optical tracks of diffractive optical regions having different periodicities with respect to consecutive identical diffractive optical regions to produce diffracted beams of light from at least one beam of light emitted from a light source. The diffracted beams of light are received at photodetectors, which produce electrical signals in response to the received beams of light. The electrical signals are related to the displacement information being measured.

28 Claims, 11 Drawing Sheets

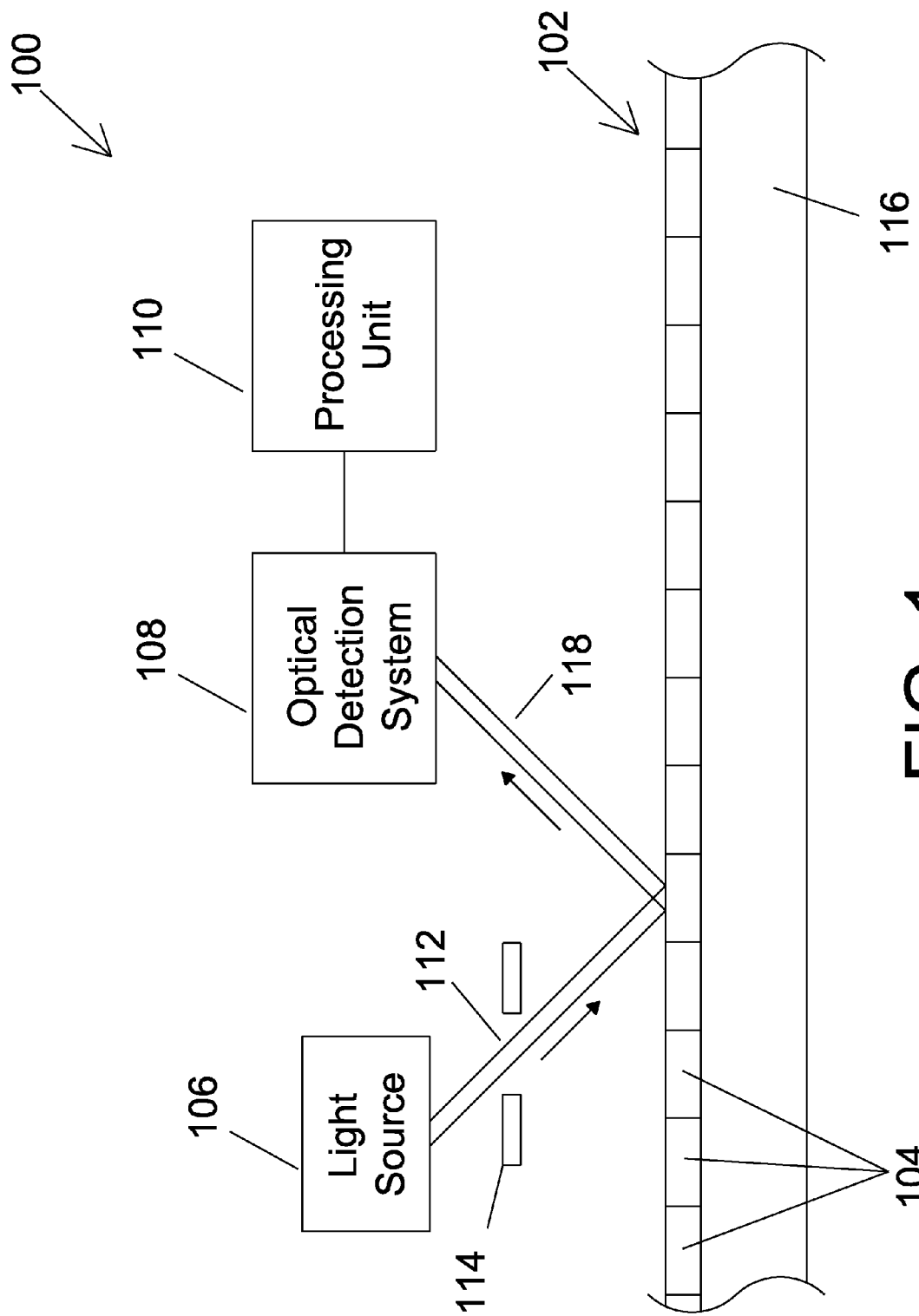

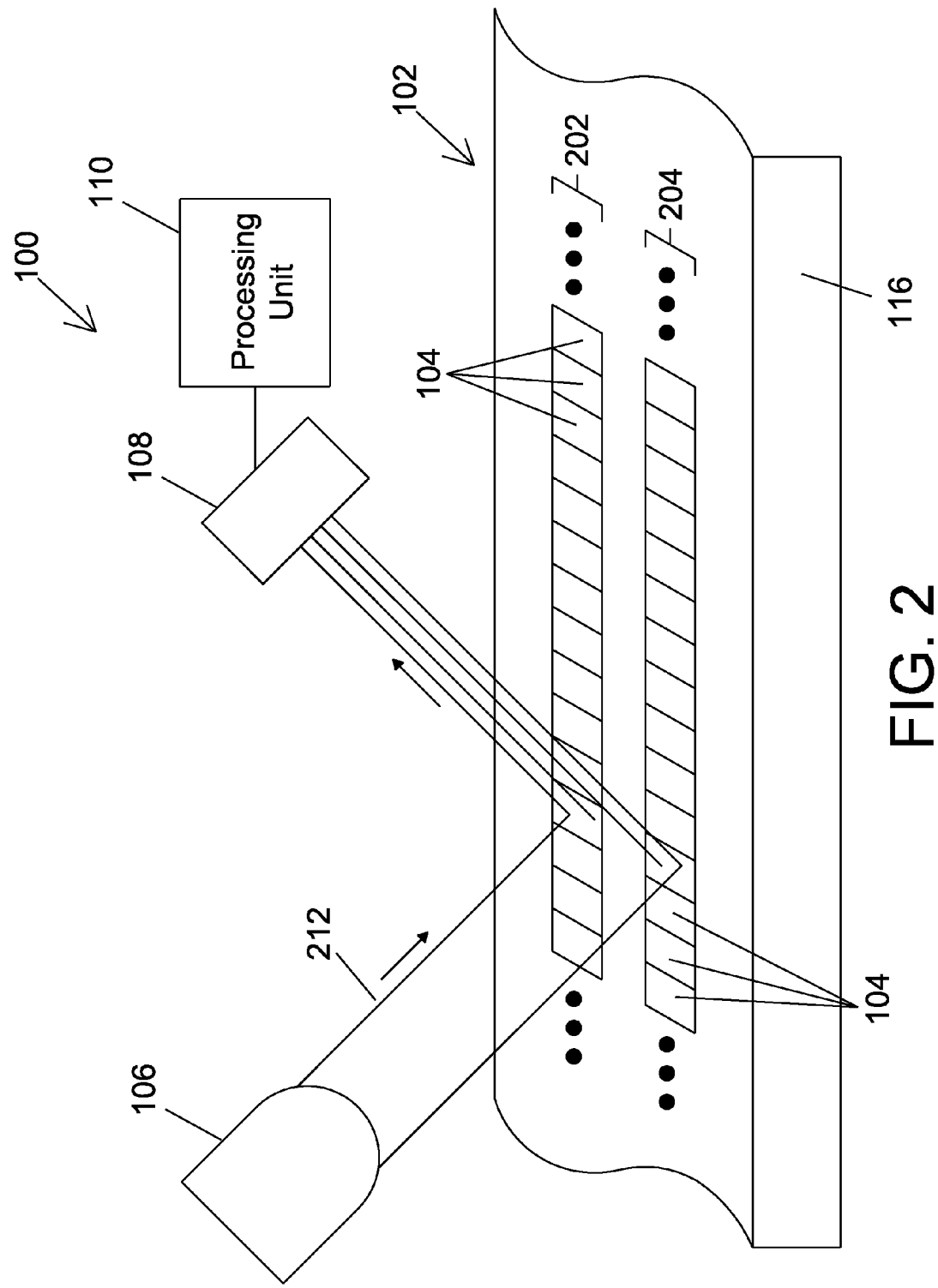

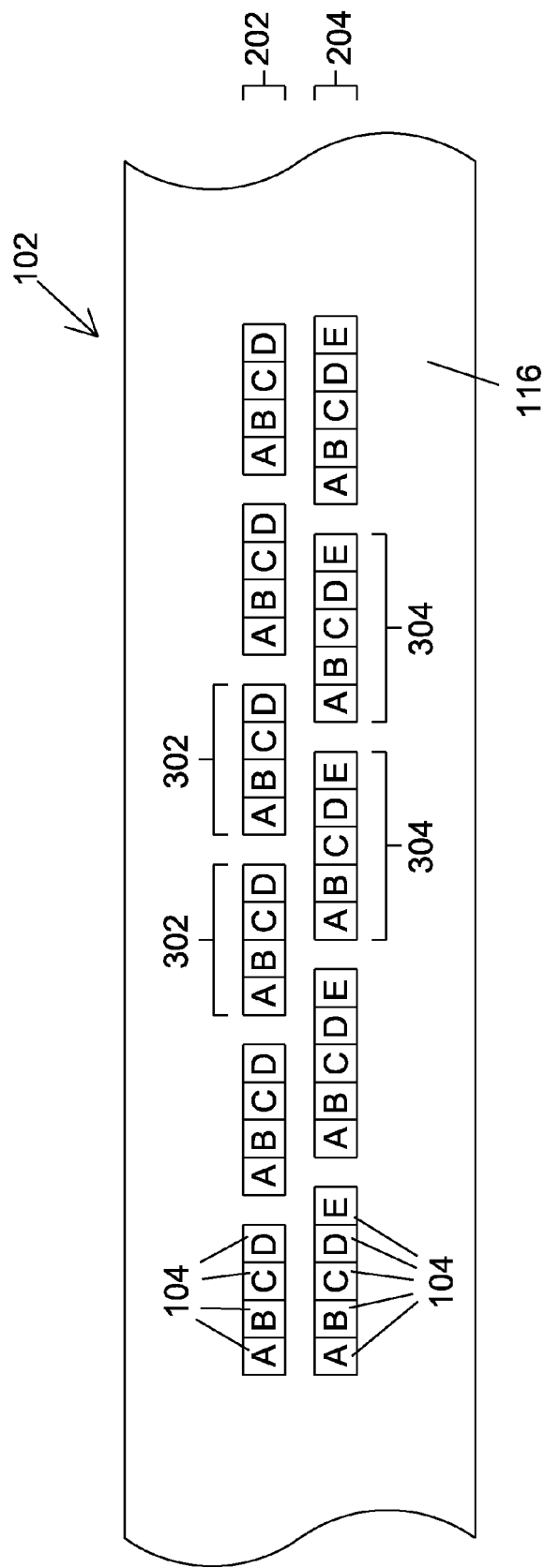

OPTICAL ENCODER AND METHOD FOR MEASURING DISPLACEMENT INFORMATION USING MULTIPLE OPTICAL TRACKS OF DIFFRACTIVE OPTICAL REGIONS HAVING DIFFERENT PERIODICITIES

CROSS REFERENCE TO RELATED APPLICATION

This application is entitled to the benefit of U.S. Provisional Patent Application Ser. No. 61/154,749, filed on Feb. 23, 2009, which is incorporated herein by reference.

FIELD OF THE INVENTION

The invention relates to encoders, and more particularly to an optical encoder.

BACKGROUND OF THE INVENTION

Optical encoders use optical signals to detect mechanical positions and motions in various types of systems. The mechanical positions and motions detected by optical encoders can be related to linear or rotational displacements of moveable components, such as shafts of motors. There are two common types of optical encoders, absolute position encoders and incremental encoders. Both types of optical encoders can determine mechanical positions and motions. The absolute position encoders can determine the exact mechanical position at any moment of operation, even at power-up. The incremental encoders, on the other hand, lose the existing position data at power-down, and cannot determine the exact mechanical position at power-up. However, the incremental encoders are less expensive and require less processing power than the absolute position encoders. Thus, the incremental encoders enjoy a greater market share than the absolute position encoders.

A simple conventional optical encoder typically includes an encoder member positioned between a light source and a photodetector. The encoder member includes a number of openings, which allow light from the light source to reach the photodetector as the encoder member is rotated or linearly displaced with respect to the light source and the photodetector. The photodetector generates signals in response to incident light that can be analyzed to determine the relative position of the encoder member with respect to the light source and the photodetector.

A typical absolute position optical encoder uses an encoder member with multiple optical tracks of opaque and transparent regions to provide unique optical information at different positions along the encoder member. At each predefined position, a unique combination of transmitted light due to the opaque and transparent regions of the optical tracks is sensed at multiple photodetectors. Thus, the absolute position optical encoder can determine the relative position of the encoder member by optically sensing the light transmitted through the optical tracks on the encoder member.

A concern with conventional absolute position optical encoders is that encoder members with multiple optical tracks are relatively expensive and difficult to manufacture. In addition, more optical tracks are needed for larger or longer encoder member, which increases the complexity and manufacturing costs of the optical encoder.

In view of these concerns, there is a need for a cost-effective optical encoder.

SUMMARY OF THE INVENTION

An optical encoder and method for measuring displacement information uses an encoder member that includes multiple optical tracks of diffractive optical regions having different periodicities with respect to consecutive identical diffractive optical regions to produce diffracted beams of light from at least one beam of light emitted from a light source. The diffracted beams of light are received at photodetectors, which produce electrical signals in response to the received beams of light. The electrical signals are related to the displacement information being measured.

An optical encoder in accordance with an embodiment of the invention comprises a light source, an encoder member and a plurality of photodetectors. The light source is configured to generate at least one beam of light. The encoder member is positioned to receive the at least one beam of light from the light source. The encoder member includes first and second optical tracks. The first optical track includes a plurality of first track segments, each of which includes one or more first diffractive optical regions configured to manipulate the at least one beam of light to produce at least one first diffracted beam of light. The second optical track includes a plurality of second track segments, each of which includes one or more second diffractive optical regions configured to manipulate the at least one beam of light to produce at least one second diffracted beam of light. The first and second optical tracks are configured such that the periodicity of consecutive identical first diffractive optical regions of the first optical track is different than the periodicity of consecutive identical second diffractive optical regions of the second optical track. The photodetectors are configured to receive the at least first diffracted beam of light and the at least second diffracted beam of light to produce electrical signals, which are related to displacement information being measured.

An encoder member for an optical encoder in accordance with an embodiment of the invention comprises a substrate, a first optical track formed on the substrate and a second optical track formed on the substrate. The first optical track includes a plurality of first optical track segments. Each of the first optical track segments includes one or more first diffractive optical regions configured to manipulate at least one input beam of light to produce at least one first diffracted beam of light. The second optical track includes a plurality of second optical track segments. Each of the second optical track segments includes one or more second diffractive optical regions configured to manipulate the at least one input beam of light to produce at least one second diffracted beam of light. The first and second optical tracks are configured such that the periodicity of consecutive identical first diffractive optical regions of the first optical track is different than the periodicity of consecutive identical second diffractive optical regions of the second optical track.

A method for measuring displacement information in accordance with an embodiment of the invention comprises emitting at least one beam of light from a light source of an optical encoder toward an encoder member of the optical encoder, optically diffracting the at least one beam of light received at a first optical track and at a second optical track of the encoder member to produce output beams of light, the first optical track including a plurality of first optical track segments, each of the first optical track segments including one or more first diffractive optical regions, the second optical track including a plurality of second optical track segments, each of the second optical track segments including one or more second diffractive optical regions, wherein the periodicity of consecutive identical first diffractive optical regions of the first optical track is different than the periodicity of consecutive identical second diffractive optical regions of the second optical track, and producing electrical signals at photodetectors of the optical encoder in response to the output beams of light received at the photodetectors, the electrical signals being related to the displacement information being measured.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIG. 1 is a diagram of an optical encoder in accordance with an embodiment of the invention.

FIG. 2 is another diagram of the optical encoder of FIG. 1.

FIG. 3 is an enlarged partial view of an encoder member of the optical encoder in accordance with an embodiment of the invention.

DETAILED DESCRIPTION

Figure 4A:
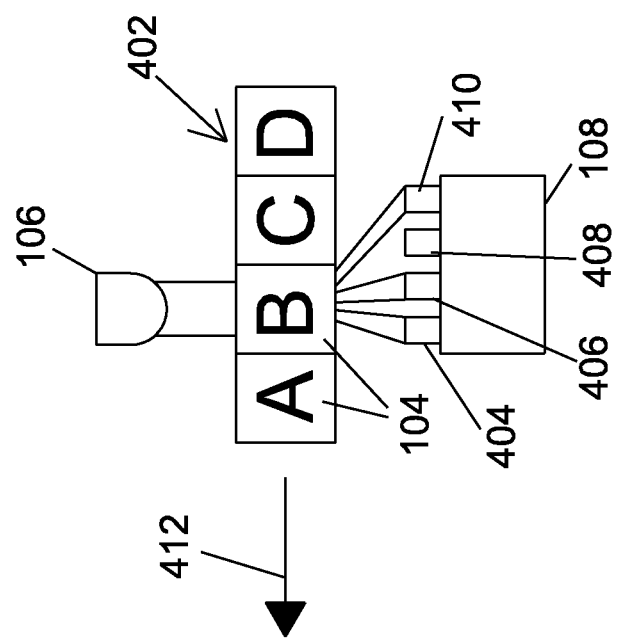
FIGS. 4A and 4B illustrate optical properties of binary coded diffractive optical regions of the encoder member in accordance with an embodiment of the invention.

With reference to FIG. 1, an optical encoder 100 in accordance with an embodiment of the invention is shown. As described in more detail below, the optical encoder 100 utilizes an encoder member 102 having diffractive optical regions 104 rather than an encoder member having one or more optical tracks of openings used in a conventional optical encoder. As a result, the manufacturing cost of the encoder member 102 is significantly less than the conventional encoder member, which reduces the overall cost of the optical encoder 100.

As shown in FIG. 1, the optical encoder 100 includes a light source 106, the encoder member 102, an optical detection system 108, and a processing unit 110. The light source 106 is configured to generate a beam of light 112 along an original direction. The light source 106 can be any type of a light-emitting device, such as a light-emitting diode or a laser diode. The light source 106 may emit light in the visible spectrum or in the non-visible spectrum, such as the infrared spectrum. The beam of light 112 produced by the light source 106 may be monochromatic or polychromatic. The optical encoder 100 may further comprise a mask plate 114 positioned adjacent to the light source 106 to receive the beam of light 112 from the light source. The mask plate 114 may have an elongate aperture to shape the beam of light 112 into an elongate beam of light. In one embodiment, the elongate aperture of the mask plate 114 is a narrow rectangular opening to shape the beam of light 112 from the light source 106 into a narrow rectangular beam of light. However, in other embodiments, the elongate aperture of the mask plate 114 can have a different shape. Furthermore, in some embodiments, the optical encoder 100 may include optical components, such as focusing lens, mirrors and beam splitter, to arrange and manipulate the beam of light 112 from the light source 106 in different ways.

The encoder member 102 is positioned to receive the beam of light 112 from the light source 106. The encoder member 102 receives the beam of light 112 through the aperture of the mask plate 114, if such a mask plate is present. In one embodiment, the encoder member 102 may be configured as a rotary disk to be rotated about its center. However, in other embodiments, the encoder member 102 can be configured in any shape to be displaced in any direction. As shown in FIG. 1, the encoder member 102 includes the diffractive optical regions 104 fabricated on a surface of a substrate 116. In the illustrated embodiment, the diffractive optical regions 104 do not extend across the entire thickness of the encoder member 102. However, in other embodiments the diffractive optical regions 104 may extend across the entire thickness of the encoder member 102. The diffractive optical regions 104 are designed to optically manipulate an incident beam of light and are used to create multiple optical tracks on the encoder member, as explained below. The substrate 116 of the encoder member 102 can be made of any material. As an example, the substrate 116 can be made of a plastic material, such as a Mylar material ("Mylar" is a registered trademark of Dupont Tejjin Films), and the diffractive optical regions 104 may be fabricated on the substrate surface. In this example, the encoder member 102 can be manufactured using conventional injection molding technology.

The diffractive optical regions 104 of the encoder member 102 are small areas of the encoder member having optical properties to optically manipulate an incident beam of light. The diffractive optical regions 104 may be configured as rectangular regions. In other embodiments, the diffractive optical regions 104 may be configured in other shapes, such as other polygonal or circular shapes. The diffractive optical regions 104 are configured to optically manipulate an incident beam of light to create a diffracted beam of light 118, as illustrated in FIG. 1. The diffractive optical regions 104 may optically manipulate an incident beam of light traveling in the original propagating direction to any modified propagating direction. In one embodiment, each diffractive optical region 104 of the encoder member 102 is further configured to shape the output beam of light into a bar-like beam of light in which the length of the output beam of light is at least twice as long as its width. In this embodiment, each diffractive optical region 104 is configured to shape the incident beam of light to a bar-like beam of light to produce an elongate oval spot on the optical detection system 108. However, in other embodiments, each diffractive optical region 104 can be configured to produce a spot of light in any shape.

The diffractive optical regions 104 of the encoder member 102 may be diffractive optical elements with microstructures that optically manipulate an incident beam of light. In one embodiment, the diffractive optical regions 104 are "digital" in the way that these regions are designed and fabricated. The digital diffractive optical regions are designed with the aid of a digital computer using an analytical or numerical approach. The digital diffractive optical regions may be fabricated in a digital manner using binary photomasks and wafer lithography. Thus, the microstructures of the digital diffractive optical regions 104 are binary (single level) or multilevel microstructures. In another embodiment, the diffractive optical regions 104 are analog. The analog diffractive optical regions may include analog structures, such as holograms formed by exposing holographically a holographic plate with a laser. The microstructures of the diffractive optical regions 104 are patterned to achieve the desired optical manipulations, such as beam shaping and beam redirecting. In an embodiment, the microstructures of the diffractive optical regions 104 are configured as linear grating microstructures. However, in other embodiments, the microstructures of the diffractive optical regions 104 may be configured in complex arrangements designed with the aid of a computer.

The optical detection system 108 of the optical encoder 100 includes multiple photodetectors, which are configured to generate electrical signals in response to received light. These electrical signals from the photodetectors are transmitted to the processing unit 110, which uses the electrical signals to determine displacement information of the encoder member 102, such as position, speed and direction. The displacement information may relate to a linear or rotational displacement, or any other type of displacement. The photodetectors of the optical detection system 108 can be any type of photodetectors, such as photodiodes, phototransistors or photoresistors. The photodetectors are positioned to receive beams of light manipulated by the diffractive optical regions 104 of the encoder member 102.

In the illustrated embodiment of FIG. 1, the optical encoder 100 is configured as a reflective-type optical encoder, and thus, the light source 106 and the optical detection system 108 are both positioned on the same side of the encoder member 102. In this embodiment, the encoder member 102 is a reflective member such that the beam of light from the light source 106 is reflected off the encoder member toward the optical detection system 108. However, in other embodiments, the optical encoder 100 may be configured as a transmissive-type optical encoder. In these embodiments, the light source 106 and the optical detection system 108 are positioned on opposite sides of the encoder member 102. In these embodiments, the encoder member 102 is a transparent member such that the beam of light from the light source 106 is transmitted through the encoder member toward the optical detection system 108.

The processing unit 110 of the optical encoder 100 is configured to receive the electrical signals from the optical detection system 108 and to process the electrical signals to determine displacement information of the encoder member, such as position, speed and direction. The processing unit 110 may be a general-purpose digital processor, such as a microprocessor or microcontroller. In other embodiments, the processing unit 110 may be a special-purpose processor, such as a digital signal processor. In still other embodiments, the processing unit 110 may be another type of controller, a field programmable gate array (FPGA), or an Application Specific Integrated Circuit (ASIC).

Turning now to FIG. 2, another diagram of the optical encoder 100 is shown. However, in FIG. 2, the mask plate 114 is not illustrated, and the light source 106 is illustrated as a laser diode, as an example. FIG. 2 shows the surface of the encoder member 102 facing the light source 106 and the optical detection system 108. As shown in FIG. 2, in this embodiment, the optical member 102 includes two optical tracks 202 and 204, which include a number of the diffractive optical regions 104. In other embodiments, the optical member 102 may include more than two optical tracks.

The operation of the optical encoder 100 is now described with reference to FIG. 2. When the optical encoder 100 is powered up, the light source 106 is driven to generate a beam of light 212 in the original propagating direction. The beam of light 212 may then be transmitted through the aperture of the mask plate 114, which changes the beam of light 212 to an elongate beam of light, if such a mask plate is present. The beam of light 212 then impinges upon both of the optical tracks 202 and 204 of the encoder member 102. As the encoder member 102 is displaced, a portion of the beam of light 212 falls on the diffractive optical regions 104 of the optical track 202. Similarly, a portion of the beam of light 212 falls on the diffractive optical regions 104 of the optical track 204. In another embodiment, more than one light source may be used, whereby each optical track receives light from a different light source. In another embodiment, the light source 106 may be configured to generate two beams of light, whereby each optical track receives one of the two beams of light emitted from the light source. In yet another embodiment, the incident beam of light from the light source 106 is split before it reaches the encoder member 102, whereby a first split beam of light reaches the optical track 202 and another split beam of light reaches the optical track 204.

When a portion of the beam of light 212 impinges on one of the diffractive optical regions 104 on the optical track 202, the portion of the incident beam of light is optically manipulated by that diffractive optical region such that the beam of light is redirected from the original propagating direction to a first modified propagating direction toward the optical detection system 108. In addition, the shape of the redirected beam of light may be changed to a bar-like beam of light by the diffractive optical region 104. In some embodiments, the incident beam of light may be separated into multiple beams of light by the diffractive optical region 104. The optical detection system 108 detects the redirected beam of light and generates an electrical signal in response to the received beams of light.

Similarly, when a portion of the beam of light 212 impinges on one of the diffractive optical regions 104 on the optical track 204, the portion of the beam of light is optically manipulated by that diffractive optical region such that the beam of light is redirected from the original propagating direction to a second modified propagating direction, which is different than the first modified propagating direction, toward the optical detection system 108. In addition, the shape of the redirected beam of light may be changed to a bar-like beam of light by the diffractive optical region 104. In some embodiments, the incident beam of light may be separated into multiple beams of light by the diffractive optical region 104. The redirected beam of light is detected by the optical detection system 108 at a different location on the optical detection system than the redirected light from the optical track 202. In an embodiment, the redirected light from the optical track 202 is detected by a first photodetector of the optical detection system 108 and the redirected light from optical track 204 is detected by a second photodetector of the optical detection system. The optical detection system 108 then generates electrical signals in response to the received beams of light.

However, when a portion of the incident beam of light impinges on certain areas in the optical track 202 and/or the optical track 204, that portion of the beam of light may not be optically manipulated so that light from these area, if any, is not detected by the optical detection system 108. In some embodiments, these areas in the optical track 202 and/or the optical track 204 may be configured to absorb incident light or direct light away from the optical detection system 108. Such areas may include gaps between the diffractive optical regions 106 in the optical track 202 and/or optical track 204.

As the encoder member 102 is displaced, portions of the incident beam of light are diffracted by different diffractive optical regions 104 and directed to the optical detection system 108. In response, the optical detection system 108 produces electrical signals, which are processed by the processor 110 to determine relative displacement information of the encoder member 102.

Turning now to FIG. 3, the optical encoder member 102 in accordance with an embodiment of the invention is shown. The same reference numbers of FIGS. 1 and 2 are used in FIG. 3 to indicate common elements. As shown in FIG. 3, the optical encoder member 102 includes the first optical track 202 and the second optical track 204. Each of the optical tracks 202 and 204 includes a number of optical track segments 302 and 304, respectively. Each of the optical track segments 302 and 304 includes one or more diffractive optical regions 104.

Adjacent optical track segments 302 of the optical track 202 may be separated by gaps of equal or different lengths. Similarly, adjacent optical track segments 304 of the optical track 204 may be separated by gaps of equal or different lengths. The gaps between adjacent optical track segments may be blank regions, i.e., unaltered regions of the encoder member substrate 116. If the gaps in the optical track 202 are of the same length and the gaps in the optical track 204 are also of the same length, then the common length of the gaps in the optical track 202 may be different than the common length of the gaps in the optical track 204. As used herein, the length of a gap or a diffractive optical region is the length along the direction in which the optical member 102 is relatively displaced. Thus, if the optical member 102 is rotationally displaced, the length of a gap or a diffractive optical region is the length along the rotational direction in which the optical member is being relatively displaced.

Each of the diffractive optical regions 104 in the optical track segments 302 and 304 can have different optical properties and manipulate an input beam of light in a unique way from the other diffractive optical regions in the same optical track segment. Each optical track segment 302 may be repeated a number of times along the optical track 202. Similarly, each optical track segment 304 may be repeated a number of times along the optical track 204. Each of the diffractive optical regions 104 in each optical track segment 302 is configured to produce an output light having a unique optical property. Similarly, each of the diffractive optical regions 104 in each optical track segment 304 is configured to produce an output light having a unique optical property. That is, each of the diffractive optical regions 104 in a single optical track segment is configured to diffract the beam of light from the light source 106 such that the diffract light detected at the optical detection system 108 is unique from the diffracted light from the other diffractive optical regions in the same optical track. Thus, the diffractive optical regions 104 are illustrated in FIG. 3 with unique reference letters, A, B, C, D and E, which indicate the different optical properties of the diffractive optical regions. In the example of FIG. 3, the optical track 202 has a spatial periodicity given by the distance between a diffractive optical region having a certain optical property and the next diffractive region in optical track 202 having an identical optical property. In other words, the spatial periodicity of the optical track 202 is given by the length of the cycle between repetitive diffractive optical regions with identical properties, for example, between two adjacent consecutive diffractive regions having optical properties "A" in FIG. 3. In the encoder member 102, the periodicity of each of the optical tracks 202 and 204 for identical diffractive optical regions may be fixed or varying.

Figure 4B:
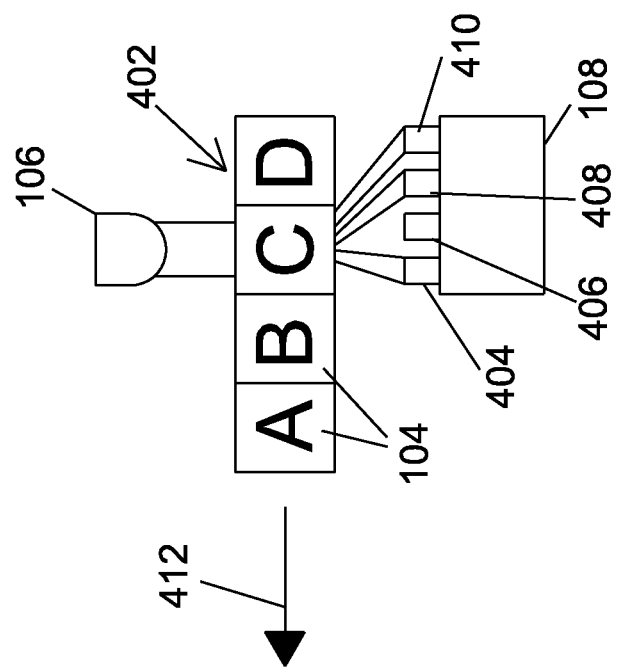

Turning now to FIGS. 4A and 4B, optical properties of the diffractive optical regions 104 in an exemplary optical track segment 402 of the encoder member 102 in accordance with an embodiment of the invention is illustrated. In this embodiment, at least some of the diffractive optical regions 104 are configured to diffract the beam of light from the light source 106 to produce multiple output beams of light impinging on the optical detection system 108. Thus, in this embodiment, the optical detection system 108 is configured to distinguish between the output beams of light from the different diffractive optical regions 104 using a plurality of photodetectors 404, 406, 408 and 410. Each of the diffractive optical regions 104 is configured to diffract an incident beam of light to produce a particular light pattern of one or more output beams of light, which can represent a binary code. The produced light patterns from the diffractive optical regions 104 depend on the optical properties of the diffractive optical region through which the incident beam of light is transmitted. Thus, different diffractive optical regions 104 can be used to produce different optical binary codes, which can be sensed by the optical detection system 108 for displacement measurement. These types of diffractive optical regions 104 will sometimes be referred to herein as binary coded diffractive optical regions.

An operation of the optical encoder 100 using the binary coded diffractive optical regions 104 is described with reference to FIGS. 4A and 4B. As the encoder member 102 is displaced, the input beam of light from the light source 106 is sequentially diffracted by the different diffractive optical regions 104 of the encoder member 102, which produce different light patterns. In FIG. 4A, the encoder member 102 has been displaced in a direction indicated by the arrow 412 such that the input beam of light from the light source 106 impinges on the "B" diffractive optical region 104, which diffracts the input beam of light into three output beams of light toward the photodetectors 404, 406 and 410 of the optical detection system 108. Thus, the output beams of light from the B" diffractive optical region 104 are detected at these photodetectors. In FIG. 4B, the encoder member 102 has now been displaced in a direction indicated by the arrow 412 such that the input beam of light from the light source 106 impinges on the "C" diffractive optical region 104, which diffracts the input beam of light to produce into three output beams of light, which are directed to the photodetectors 404, 408 and 410 of the optical detection system 108, and thus, are detected at these photodetectors. Thus, as the encoder member 102 is displaced in the direction indicated by the arrow 412, the binary coded beam pattern at the photodetectors 404-410 of the optical detection system 108 will vary as the different diffractive optical regions 104 optically diffract the input beam of light, as illustrated in FIGS. 4A and 4B. The varying light pattern detected by the optical detection system 108 can then be used for measuring the relative displacement information of the encoder member 102.

Figure 5A:
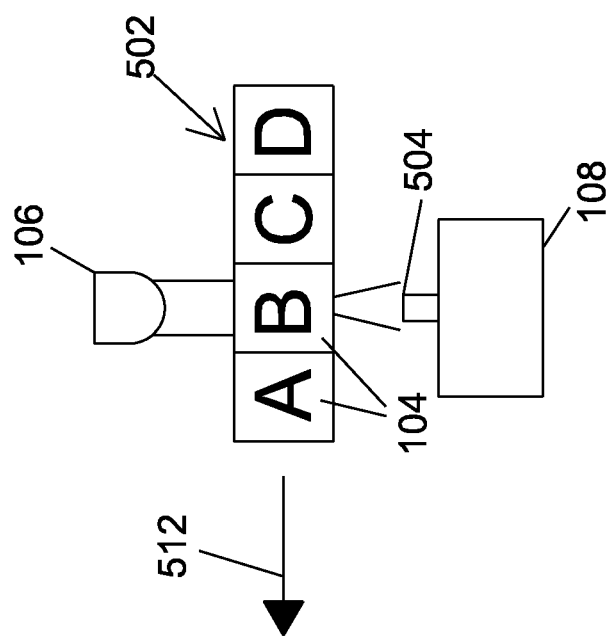
FIGS. 5A and 5B illustrate optical properties of intensity-based diffractive optical regions of the encoder member in accordance with an embodiment of the invention.
Figure 5B:
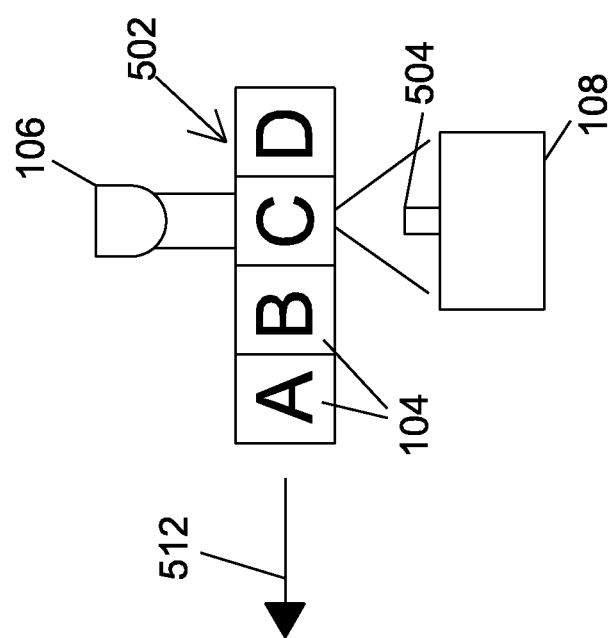

Turning now to FIGS. 5A and 5B, optical properties of the diffractive optical regions 104 in an exemplary optical track segment 502 of the encoder member 102 in accordance with another embodiment of the invention is illustrated. In this embodiment, each of the digital diffractive optical regions 104 is configured to diffract the beam of light from the light source 106 to produce an output beam of light having a particular intensity distribution pattern such that the intensity of the light transmitted through that diffractive optical region 104 and incident on a certain fixed region of the optical detection system 108 can be controlled. Thus, in this embodiment, the optical detection system 108 can be configured to distinguish between the output beams of light from different diffractive optical regions 104 using a single photodetectors 504. If a particular diffractive optical region 104 is configured to produce a focused output beam of light, the intensity of the light incident at the photodetector 504 is increased. In contrast, if a particular diffractive optical region 104 is configured to produce a defocused output beam of light, the intensity of the light incident at the photodetector 504 is decreased. Each of the diffractive optical regions 104 is configured to diffract an incident beam of light to produce a particular light intensity at the photodetector 504. Consequently, the light intensity sensed at the photodetector 504 depends on the optical properties of the diffractive optical region through which the incident beam of light is transmitted. Thus, different diffractive optical regions 104 can be used to produce intensity-based codes, which can be sensed by the optical detection system 108 for displacement measurement. These types of diffractive optical regions 104 will sometimes be referred to herein as intensity-based diffractive optical regions.

An operation of the optical encoder 100 using the intensity-based diffractive optical regions 104 is described with reference to FIGS. 5A and 5B. As the encoder member 102 is displaced, the input beam of light from the light source 106 is sequentially diffracted by the different diffractive optical regions 104 of the encoder member, which produce output beams of light having different intensity distribution patterns. In FIG. 5A, the encoder member 102 has been displaced in a direction indicated by the arrow 512 such that the input beam of light from the light source 106 impinges on the "B" diffractive optical region 104, which diffracts the input beam of light to produce an output beam of light having a narrow intensity distribution pattern, resulting in higher light intensity detected by the photodetector 504 of the optical detection system 108. In FIG. 5B, the encoder member 102 has now been displaced in a direction indicated by the arrow 512 such that the input beam of light from the light source 106 impinges on the "C" diffractive optical region 104, which diffracts the input beam of light to produce an output beam of light having a wider intensity distribution pattern, resulting in lower light intensity detected by the photodetector 504 of the optical detection system 108. Thus, as the encoder member 102 is displaced in a direction indicated by the arrow 512, the light intensity detected by the photodetector 504 will vary as the different diffractive optical regions 104 optically diffract the input beam of light. The varying light intensity detected by the photodetector 504 can then be used for measuring the relative displacement information of the encoder member 102.

Using the different diffractive properties of the diffractive optical regions 104, the optical encoder 100 can be configured to function as an incremental position optical encoder or an absolute position optical encoder based on the pattern of light incident on the optical detection system 108 or on the intensity of light incident on the optical detection system.

Figure 6:
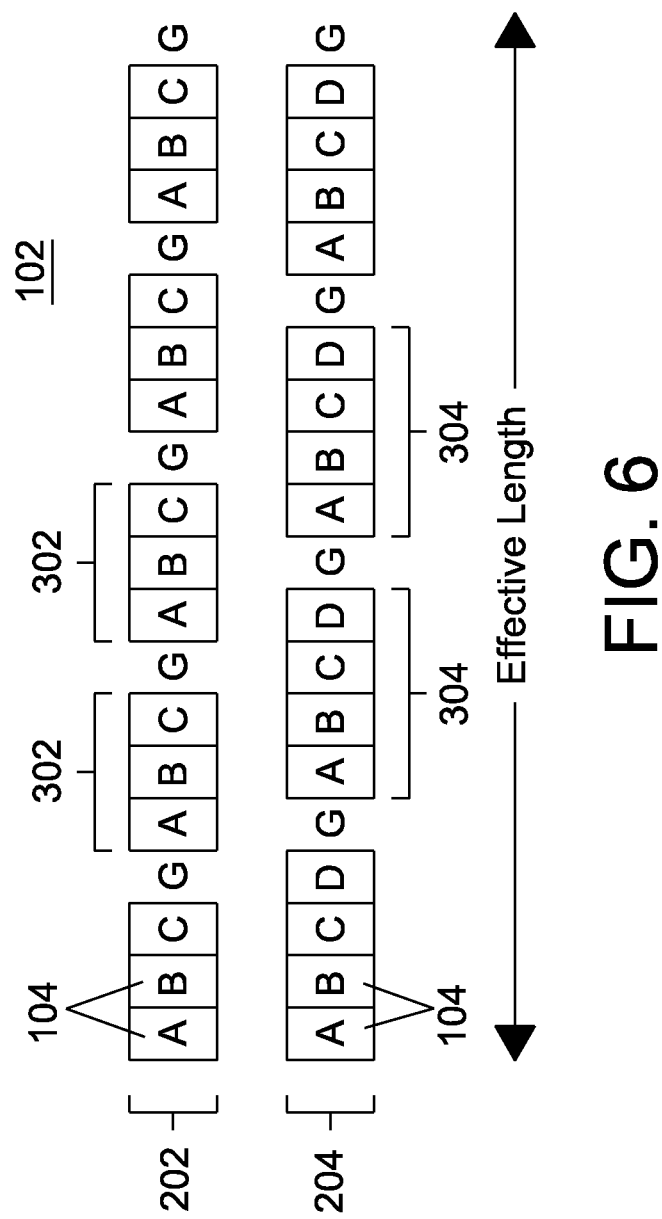
FIG. 6 is an enlarged partial view of the encoder member with two optical tracks in accordance with another embodiment of the invention.

Turning now to FIG. 6, the optical tracks 202 and 204 of the encoder member 102 in accordance with an embodiment of the invention are shown. The same reference numbers of previous figures are used in FIG. 6 to indicate common elements. As shown in FIG. 6, the optical track 202 and optical track 204 include a number of the optical track segments 302 and 304, respectively. As described above with reference to FIGS. 4A, 4B, 5A and 5B, each diffractive optical region 104 of each optical track segment 302 and 304 have different optical properties, as illustrated in FIG. 6 by letters "A", "B", "C" and "D", whereby each letter represents different optical properties. The letter "G" in FIG. 6 represents the gaps between optical track segments 302 and 304, which have different optical properties than the diffractive optical regions 104. For example, the gaps "G" may not reflect or transmit an incident beam of light. In one embodiment, the "A" diffractive optical regions 104 in the optical track 202 may have different optical properties than the "A" diffractive optical regions 104 in the optical track 204. In another embodiment, the "A" diffractive optical regions 106 in optical track 202 may have the same optical properties as the diffractive optical regions 106 represented by "A" in optical track 204. However, other permutations are also possible. For example, in some embodiments, only some of the diffractive optical regions 104 of optical track segments 302 may have similar optical properties to the diffractive optical regions 104 of optical track segments 304. The diffractive optical regions 104 of the optical tracks 202 and 204 may be binary coded, intensity based, or of any other diffractive type. In some embodiments, one or both of the optical tracks 202 and 204 may have diffractive optical regions of the same type. In other embodiments, one or both of the optical tracks 202 and 204 may have diffractive optical regions of more than one type. For example, the optical track 202 may only have intensity-based diffractive optical regions, whereas the optical track 204 may have only binary coded diffractive optical regions.

In the embodiment of FIG. 6, the optical track 202 is composed of a repeating pattern of the optical track segments 302, whereby each optical track segment has the same configuration of the diffractive optical regions 104 (in this case "ABC"). Similarly, all the optical track segments 304 have the same configuration of diffractive optical regions 104 ("ABCD"). The optical segments 302 and 304 are separated from each other by gaps "G". The optical track 202 has a different repetitive cycle than the optical track 204, meaning that the spatial periodicity of consecutive identical diffractive optical regions of each optical track is different. In the embodiment of FIG. 6, the optical track 202 has a repetitive cycle of three diffractive optical regions "A", "B" and "C" and one gap "G", whereas the optical track 204 has a repetitive cycle of four diffractive optical regions "A", "B", "C" and D and one gap "G".

In operation, an input beam of light (or a portion of an input beam of light) impinges on the diffractive optical regions 104 of each of the optical tracks 202 and 204 at the same position along the direction of displacement as indicated by the arrow 602, e.g., on the far left "A" diffractive optical region in the optical track 202 and the far left "A" diffractive optical region in the optical track 204. As the encoder member 102 is displaced in the direction indicated by the arrow 602 in FIG. 6, the input beam of light then becomes diffracted by the "B" diffractive optical region in the optical track 202 and the "B" diffractive optical region in the optical track 204, and so on. In the embodiment of FIG. 6, the diffractive optical regions 104 are of the same length in the optical tracks 202 and 204. However, in other embodiments, the diffractive optical regions 104 may be of different lengths.

As the encoder member 102 is displaced, the absolute positions of the encoder member can be determined using readings of the output beams of light from the diffractive optical regions 104 of the optical tracks 202 and 204. The readings for the optical track 202 and optical track 204 are combined to give unique absolute position data until a unique combination a particular diffractive optical region 104 of the optical track 202 and a particular diffractive optical region 104 of the optical track 204 is repeated. As illustrated in the example of FIG. 6, the different optical track segments 302 and 304 of the optical tracks 202 and 204, respectively, result in an extended absolute encoder having an effective length greater than each of the individual optical tracks. For example, whereas the optical track 202 has an effective length of four diffractive optical regions (A+B+C+G) for absolute position determination, assuming that the length of the gap "G" is the same as the diffractive optical regions 104, and whereas the optical track 204 has an effective length of five diffractive optical regions (A+B+C+D+G) for absolute position determination, using both the optical tracks 202 and 204 extends the absolute encoder length to an effective length equivalent to twenty diffractive optical regions. The combination of the readings of the two optical tracks 202 and 204 is unique until it repeats at the twenty-first position, as shown in the table below. The combination of the readings of the optical tracks 202 and 204 is dependent on the order of the readings from the tracks. For example, the combination of "A" and "G", which results in an absolute position of "5", is different than the combination of "G" and "A", which results in an absolute position of "16".

| $1^{st}$ optical track | $2^{nd}$ optical track | position |
|---|---|---|
| A | A | 1 |
| B | B | 2 |
| C | C | 3 |
| G | D | 4 |
| A | G | 5 |
| B | A | 6 |
| C | B | 7 |
| G | C | 8 |
| A | D | 9 |
| B | G | 10 |
| C | A | 11 |
| G | B | 12 |
| A | C | 13 |
| B | D | 14 |
| C | G | 15 |
| G | A | 16 |
| A | B | 17 |
| B | C | 18 |
| C | D | 19 |
| G | G | 20 |
| A | A | 1 |

The extended effective length of an absolute optical encoder using the two optical tracks 202 and 204 shown in FIG. 6 depends on the length $L_1$ of the optical track segments 302, the length $L_2$ of the optical track segments 304, and the length G of the gaps between adjacent optical track segments. In one embodiment, the ratio of the length of the first optical track segments 302 to the second optical track segments 304 represents an irreducible fraction (a fraction in the lowest terms), in other words $(L_1+G)$ and $(L_2+G)$ are coprime. Thus, the extended effective length of the absolute encoder is:

$$L_{eff}=(L_1+G)(L_2+G),$$

when the gaps between optical track segments 302 and the gaps between optical track segments 304 are the same length as the diffractive optical regions 104. Thus, using the optical track segments 302 and the 304 of different lengths, the effective length of the encoder member 102 can be extended as long as the periodicity of consecutive identical diffractive optical regions 104 of the optical track 202 is different than the periodicity of consecutive identical diffractive optical regions 104 of the second optical track 204.

In an embodiment, the optical track readings of the two optical tracks 202 and 204 are combined and stored as a unique combined value. A calibration may be done to match the combined value to an absolute position value. A calibration table may be stored, for example, in non-volatile memory and used to convert the combined value to an absolute value. The calibration table may be similar to the table shown above, where "AA" would result in an absolute position of "1", "BB" would result in an absolute position of "2" etc.

Figure 7:
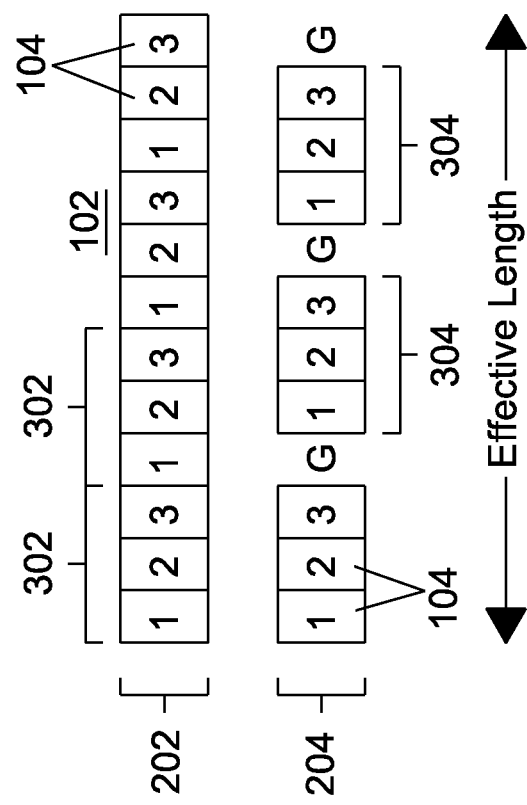
FIG. 7 is an enlarged partial view of the encoder member with two optical tracks in accordance with another embodiment of the invention.

Turning now to FIG. 7, the optical tracks 202 and 204 of the encoder member 102 in accordance with another embodiment of the invention is shown. The same reference numbers of previous figures are used in FIG. 7 to indicate common elements. As shown in FIG. 7, the optical track 202 and optical track 204 include a number of the optical track segments 302 and 304, respectively. In one configuration, when the optical track segments 302 of the optical track 202 and the optical track segments 304 of optical track 204 have the same length, unequal periodicities between the two optical tracks can be achieved with gaps between adjacent optical track segments 302 having a different length than gaps between adjacent optical track segments 304. In the illustrated embodiment of FIG. 7, the optical track 202 does not include gaps between adjacent optical track segments 302, whereas the optical track 304 contains gaps between adjacent optical track segments 304. The optical track segments 302 and the optical track segments 304 have the same length, and may have the same configuration of diffractive optical regions 104. Although the same numerals are used in tracks 202 and 204 to identify the diffractive optical regions 106, the diffractive optical regions of the track 202 may have similar or different optical properties to the diffractive optical regions of the track 204. For example, the diffractive optical regions 106 identified by the number "1" in the optical track segments 302 may be different than the diffractive optical regions 104 identified by number "1" in the optical track segments 304. Even though the lengths of the optical track segments 302 and the 304 may be the same, the effective length of the encoder member can still be extended.

In other embodiments, the lengths of the optical track segments 302 and the 304 may be the same, but the optical track segments 302 may include a different number of the diffractive optical regions 104 than the optical track segments. As an example, each of the optical track segments 302 may include four diffractive optical elements, whereas each of the optical track segments 304 may include five diffractive optical elements, but the lengths of all the optical track segments 302 and 304 may be the same. Thus, even though the lengths of the optical track segments 302 and the 304 may be the same, the effective length of the encoder member can still be extended by using different number of diffractive optical regions 104 in the optical track segments 302 and 304.

Figure 8:
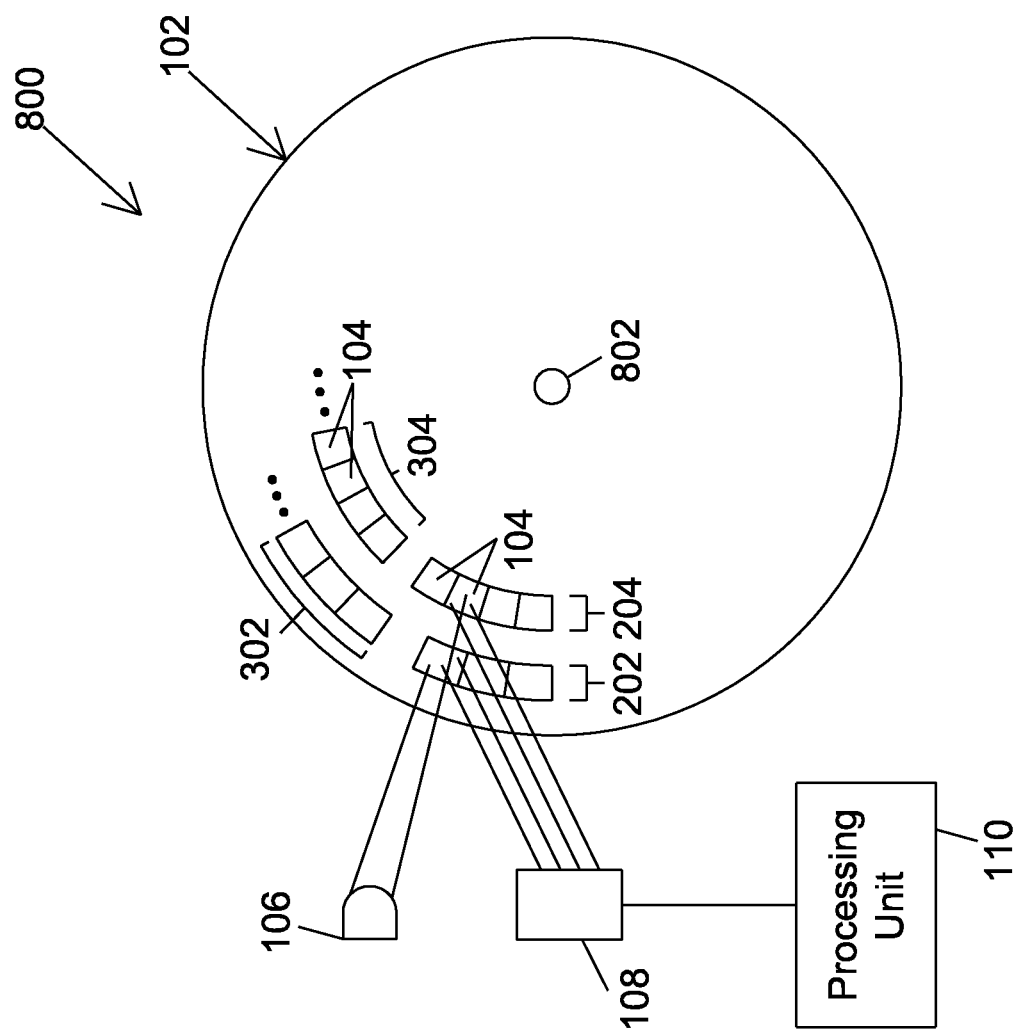
FIG. 8 is a diagram of a rotary optical encoder in accordance with an embodiment of the invention.

Turning now to FIG. 8, a rotary optical encoder 800 in accordance with another embodiment of the invention is shown. The same reference numbers of previous figures are used in FIG. 8 to indicate common elements. As shown in FIG. 8, the optical encoder 800 comprises the light source 106, the encoder member 102, the optical detection system 108 and the processing unit 110. The encoder member 102 includes at least the first optical track 202 and the second optical track 204. The optical tracks 202 and 204 include a number of the optical track segments 302 and 304, respectively, wherein each of the optical track segments 302 and 304 includes one or more diffractive optical regions 104. The optical tracks 202 and 204 may have any configuration described above. As shown in FIG. 8, the encoder member 102 includes an opening 802, which is designed to accommodate a rotating shaft. The shape and size of the opening 802 can vary depending on the rotating shaft for which the encoder member 102 is designed. As an example, the opening 802 of the encoder member 102 may be a circular opening to accommodate a cylindrical rotating shaft. In this embodiment, the encoder member 102 is in the shape of a circular disk, and the optical tracks 202 and 204 are concentric circular band areas about the center of the encoder member 102. However, in other embodiments, the encoder member 102 and the optical tracks 202 and 204 may have other configurations. The rotary optical encoder 800 is configured to measure displacement information of the encoder member 102 as the encoder member is rotationally displaced.

Although the encoder member 102 of the optical encoders 100 and 800 has been illustrated and described as having only two optical tracks, the encoder member may include more than two optical tracks of diffractive optical regions in other embodiments. Three or more optical tracks may be used in the encoder member 102 to further extend the effective length of the encoder member. Using three optical tracks may result in an extended effective length equal to the product of the effective lengths of each individual optical track.

Figure 9:
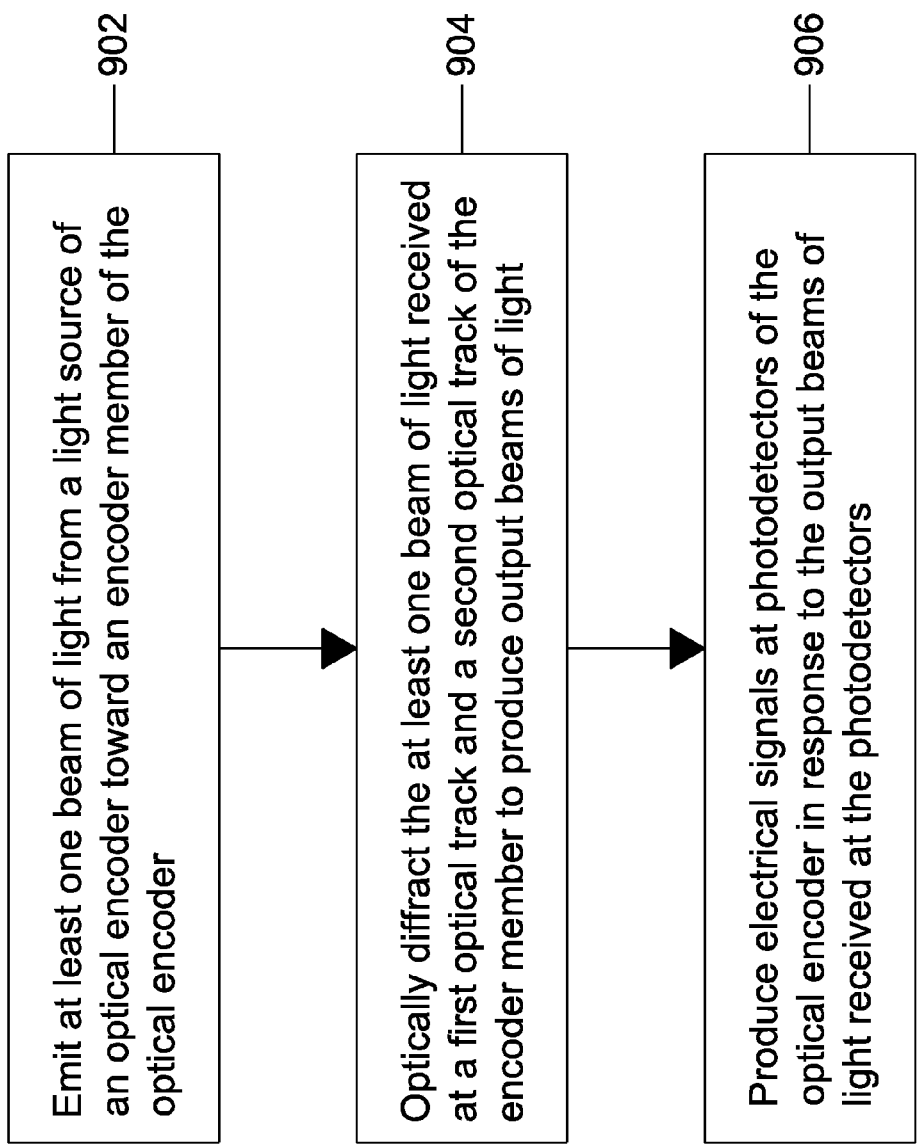
FIG. 9 is a flowchart of a method for measuring displacement information using an optical encoder in accordance with an embodiment of the invention.

A method for measuring displacement information using an optical encoder, such as the optical encoder 100, in accordance with an embodiment of the invention is now described with reference to a flow diagram of FIG. 9. At block 902, at least one beam of light is emitted from a light source of the optical encoder toward an encoder member of the optical encoder. Next, at block 904, the at least one beam of light received at a first optical track and at a second optical track of the encoder member is optically diffracted to produce output beams of light. The first optical track includes a plurality of first optical track segments. Each of the first optical track segments includes one or more first diffractive optical region. The second optical track includes a plurality of second optical track segments. Each of the second optical track segments includes one or more second diffractive optical regions. The periodicity of consecutive identical first diffractive optical regions of the first optical track is different than the periodicity of consecutive identical second diffractive optical regions of the second optical track. Next, at block 906, electrical signals are produced at photodetectors of the optical encoder in response to the output beams of light received at the photodetectors. The electrical signals are related to the displacement information being measured.

A fabrication process of the encoder member 102 in accordance with an embodiment of the invention is now described. First, a mask layout of the microstructures of the digital diffractive optical regions 104 and/or the optical track segments 302 and 304. The mask layout design can be achieved using an analytical or numerical approach with the aid of a computer. Next, a photomask is produced using the mask layout design. Using the photomask, a master encoder member is produced via photolithographic and etching processes. In this embodiment, a silicon disk is used to produce the master encoder member. Next, the master encoder member is used to produce the encoder member 102 using, for example, embossing, casting or injection molding technology. In this fashion, the encoder member 102 can be mass fabricated in a cost effective manner.

In other embodiments, different techniques can be used to produce the master encoder member. These techniques include:
1) Standard CD authoring via laser patterning similar to conventional audio CD master recording on photo-resist covered plate with laser exposure;
2) Successive holographic exposure of an index modulation or surface relief (photoresist) material; and
3) Other exotic lithographic techniques including direct e-beam write, focused ion beam microstructuring, excimer laser micro ablation, fast atom beam exposure, deep proton irradiation, gray scale lithography technologies, etc.

A fabrication process of the encoder member 102 in accordance with another embodiment of the invention is now described. The diffractive optical regions 104 may be produced using computer generated holographic diffract technology. Two or more optical tracks of optical track segments of different periodicity may be repetitively embossed onto an emboss-capable substrate, such as a plastic material. The plastic material may be a Mylar material ("Mylar" is a registered trademark of Dupont Tejjin Films). The computer generated holograms are etched on a drum which is then repeatedly embossed over the plastic material as the material is fed through the drum. In another embodiment, the diffractive optical regions 104 are repeatedly embossed by stamping and indexing a substrate with a stamping head.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:
1. An optical encoder comprising:
a light source configured to generate at least one beam of light;
an encoder member positioned to receive said at least one beam of light from said light source, said encoder member including:
a first optical track including a plurality of first optical track segments, each of said first optical track segments including one or more first diffractive optical regions configured to manipulate said at least one beam of light to produce at least one first diffracted beam of light; and
a second optical track including a plurality of second optical track segments, each of said second optical track segments including one or more second diffractive optical regions configured to manipulate said beam of light to produce at least one second diffracted beam of light;
wherein said first and second optical tracks are configured such that the periodicity of consecutive identical first diffractive optical regions of said first optical track is different than the periodicity of consecutive identical second diffractive optical regions of said second optical track and wherein at least one particular first diffractive optical region is positioned on the first optical track between the consecutive identical first diffractive optical regions and at least one particular second diffractive optical region is positioned on the second optical track between the consecutive identical second diffractive optical regions, the particular first diffractive optical region having a different diffractive property than the consecutive identical first diffractive optical regions, the particular second diffractive optical region having a different diffractive property than the consecutive identical second diffractive optical regions; and
a plurality of photodetectors configured to receive said at least first diffracted beam of light and said at least one second diffracted beam to produce electrical signals, said electrical signals being related to displacement information being measured.

2. The encoder of claim 1, wherein the length of at least one of said first optical track segments is different than the length of at least one of said second optical track segments.

3. The encoder of claim 1, wherein said first optical track segments are all of equal length and wherein said second optical track segments are all of equal length, the length of said first optical track segments being different than the length of said second optical track segments.

4. The encoder of claim 3, wherein the number of said first diffractive optical elements included in each of said first optical track segments differs from the number of said second diffractive optical elements included in each of said second optical track segments.

5. The encoder of claim 3, wherein the number of said first diffractive optical elements included in each of said first optical track segments is the same as the number of said second diffractive optical elements included in each of said second optical track segments.

6. The encoder of claim 1, wherein said first and second optical track segments are all of equal length.

7. The encoder of claim 6, wherein each of said second optical track segments is identical to said first optical track segments such that all the first and second optical track segments are the same, and wherein at least one of said first and second optical tracks includes gaps between at least some of said first and second optical track segments.

8. The encoder of claim 7, wherein said first optical track includes first gaps of equal length between said first optical track segments and said second optical track includes second gaps of equal length between said second optical track segments, the length of said first gaps being different than the length of said second gaps.

9. The encoder of claim 6, wherein the number of said first diffractive optical elements included in each of said first optical track segments differs from the number of said second diffractive optical elements included in each of said second optical track segments.

10. The encoder of claim 1, wherein each of said first diffractive optical regions for one of said first optical track segments is configured to diffract said at least one beam of light from said light source into one or more diffracted beams of light.

11. The encoder of claim 1, wherein each of said first diffractive optical regions for one of said first optical track segments is configured to uniquely diffract said at least one beam of light from said light source such that different light intensities are produced at one of said photodetectors for that first optical track segment.

12. The encoder of claim 1, wherein said first optical track or said second optical track includes at least one gap between at least some of said first and second optical track segments.

13. The encoder of claim 12, wherein said first optical track includes first gaps between said first optical track segments and said second optical track includes second gaps between said second optical track segments, said first and second gaps and said first and second diffractive optical regions all being of equal length.

14. The encoder of claim 1, wherein said first diffractive optical regions or said second diffractive optical regions are holograms.

15. The encoder of claim 1, wherein said substrate is a circular disk and wherein said first optical track segments and said second optical track segments are positioned concentrically on said circular disk.

16. An encoder member for an optical encoder comprising:
a substrate;
a first optical track formed on said substrate, said first optical track including a plurality of first optical track segments, each of said first optical track segments including one or more first diffractive optical regions configured to manipulate at least one input beam of light to produce a least one first diffracted beam of light; and
a second optical track formed on said substrate, said second optical track including a plurality of second optical track segments, each of said second optical track segments including one or more second diffractive optical regions configured to manipulate said at least one input beam of light to produce at least one second diffracted beam of light,
wherein said first and second optical tracks are configured such that the periodicity of consecutive identical first diffractive optical regions of said first optical track is different than the periodicity of consecutive identical second diffractive optical regions of said second optical track and wherein at least one particular first diffractive optical region is positioned on the first optical track between the consecutive identical first diffractive optical regions and at least one particular second diffractive optical region is positioned on the second optical track between the consecutive identical second diffractive optical regions, the particular first diffractive optical region having a different diffractive property than the consecutive identical first diffractive optical regions, the particular second diffractive optical region having a different diffractive property than the consecutive identical second diffractive optical regions.

17. The encoder member of claim 16, wherein the length of at least one of said first optical track segments is different than the length of at least one of said second optical track segments.

18. The encoder member of claim 16, wherein said first optical track segments are all of equal length and wherein said second optical track segments are all of equal length, the length of said first optical track segments being different than the length of said second optical track segments.

19. The encoder member of claim 18, wherein the number of said first diffractive optical elements included in each of said first optical track segments differs from the number of said second diffractive optical elements included in each of said second optical track segments.

20. The encoder member of claim 16, wherein said first and second optical track segments are all of equal length.

21. The encoder of claim 20, wherein each of said second optical track segments is identical to said first optical track segments such that all the first and second optical track segments are the same, and wherein said first optical track includes first gaps of equal length between said first optical track segments and said second optical track includes second gaps of equal length between said second optical track segments, the length of said first gaps being different than the length of said second gaps.

22. The encoder member of claim 16, wherein said encoder member is a circular disk and wherein said first optical track segments and said second optical track segments are positioned concentrically on said circular disk.

23. A method for measuring displacement information, said method comprising:
emitting at least one beam of light from a light source of an optical encoder toward an encoder member of said optical encoder;
optically diffracting said at least one beam of light received at a first optical track and at a second optical track of said encoder member to produce output beams of light, said first optical track including a plurality of first optical track segments, each of said first optical track segments including one or more first diffractive optical regions, said second optical track including a plurality of second optical track segments, each of said second optical track segments including one or more second diffractive optical regions, wherein the periodicity of consecutive identical first diffractive optical regions of said first optical track is different than the periodicity of consecutive identical second diffractive optical regions of said second optical track and wherein at least one particular first diffractive optical region is positioned on the first optical track between the consecutive identical first diffractive optical regions and at least one particular second diffractive optical region is positioned on the second optical track between the consecutive identical second diffractive optical regions, the particular first diffractive optical region having a different diffractive property than the consecutive identical first diffractive optical regions, the particular second diffractive optical region having a different diffractive property than the consecutive identical second diffractive optical regions; and producing electrical signals at photodetectors of said optical encoder in response to said output beams of light received at said photodetectors, said electrical signals being related to said displacement information being measured.

24. The method of claim 23, wherein the length of at least one of said first optical track segments is different than the length of at least one of said second optical track segments.

25. The method of claim 23, wherein said first optical track segments are all of equal length and wherein said second optical track segments are all of equal length, the length of said first optical track segments being different than the length of said second optical track segments.

26. The method of claim 23, wherein each of said second optical track segments is identical to said first optical track segments such that all the first and second optical track segments are the same, and wherein said first optical track includes first gaps of equal length between said first optical track segments and said second optical track includes second gaps of equal length between said second optical track segments, the length of said first gaps being different than the length of said second gaps.

27. The method of claim 23, wherein said optically diffracting includes diffracting said at least one beam of light at some of said first diffractive optical regions of one of said first optical track segments into multiple diffracted beams of light.

28. The method of claim 23, wherein said optically diffracting includes diffracting said at least one beam of light at some of said first diffractive optical regions of one of said first optical track segments to produce different light intensities at said photodetectors.

* * * * *